(12) United States Patent
Charlton

(10) Patent No.: US 8,141,166 B2
(45) Date of Patent: Mar. 20, 2012

(54) CONTENT ACCESS RIGHTS MANAGEMENT SYSTEM WHICH EMBEDS RESTRICTED METADATA INTO A PICTURE

(75) Inventor: Patricia Charlton, London (GB)

(73) Assignee: Motorola Solutions, Inc., Schaumburg, IL (US)

( * ) Notice: Subject to any disclaimer, the term of this patent is extended or adjusted under 35 U.S.C. 154(b) by 767 days.

(21) Appl. No.: 12/088,459

(22) PCT Filed: Jun. 30, 2006

(86) PCT No.: PCT/US2006/025900
§ 371 (c)(1),
(2), (4) Date: Mar. 28, 2008

(87) PCT Pub. No.: WO2007/040696
PCT Pub. Date: Apr. 12, 2007

(65) Prior Publication Data
US 2008/0215509 A1    Sep. 4, 2008

(30) Foreign Application Priority Data

Sep. 30, 2005 (GB) .................................. 0519998.9

(51) Int. Cl.
*G06F 7/04* (2006.01)
(52) U.S. Cl. ......................................... 726/27; 706/62
(58) Field of Classification Search ................... 706/12, 706/20, 45–48, 62; 705/307, 310, 319; 713/151, 713/182; 726/2, 26–35
See application file for complete search history.

(56) References Cited

U.S. PATENT DOCUMENTS

| 6,898,706 | B1 | 5/2005 | Venkatesan |
| 6,990,502 | B2 | 1/2006 | Waxman |
| 6,996,720 | B1 | 2/2006 | DeMello |
| 7,089,429 | B2 | 8/2006 | Gustafsson |

(Continued)

FOREIGN PATENT DOCUMENTS

| EP | 1320016 A3 | 4/2005 |
| GB | 2404536 A | 2/2005 |

OTHER PUBLICATIONS

UK Patent Office, Great Britain Application No. GB0519998.9, Combined Search and Examination Report, Mar. 21, 2006, 8 pages.
PCT/US06/25900, International Search Report and Written Opinion, mailed May 8, 2007, 7 pages.
UK Patent Office, Great Britain Application No. GB0519998.9, Examination Report, Dec. 3, 2007, 7 pages.

(Continued)

*Primary Examiner* — David Vincent
(74) *Attorney, Agent, or Firm* — Valerie M. Davis; Terri Hughes Smith; Kenneth A. Haas

(57) ABSTRACT

An apparatus comprises a content item receiver which receives a content item such as a digital photo or an audio or video clip. A user preference model generates data indicative of user preferences for content item access. An access rule processor determines a set of self-governance rules for the first content item in response to the user preference model. The self-governance rules are indicative of allowable actions for the first content item in other devices. A file processor includes the set of self-governance rules with the content item and a network interface transmits the content item to a second apparatus. The second apparatus comprises functionality for restricting access to the content item in accordance with the set of self-governance rules. The invention may provide improved access rights management and in particular for personal content items.

17 Claims, 5 Drawing Sheets

U.S. PATENT DOCUMENTS

| | | | |
|---|---|---|---|
| 7,594,258 B2 * | 9/2009 | Mao et al. | 726/9 |
| 2001/0042043 A1 | 11/2001 | Shear | |
| 2004/0267552 A1 | 12/2004 | Gilliam | |
| 2005/0114672 A1 | 5/2005 | Duncan | |
| 2005/0216745 A1 | 9/2005 | Spears | |
| 2006/0173784 A1 | 8/2006 | Marples | |
| 2006/0248573 A1 * | 11/2006 | Pannu et al. | 726/1 |

OTHER PUBLICATIONS

PCT/US2006/025900, Preliminary Report on Patentability, mailed Apr. 10, 2008, 5 pages.

Korean Patent Office, Korean Application No. 10-2008-7010464, Office Action [translated], Notice of Preliminary Rejection, mailed Mar. 10, 2010, 4 pages.

Information Rights Management in Microsoft Office 2003.

* cited by examiner

CONTENT ACCESS RIGHTS MANAGEMENT SYSTEM WHICH EMBEDS RESTRICTED METADATA INTO A PICTURE

CROSS REFERENCE TO RELATED APPLICATIONS

This application is a National Stage filing under 35 USC §371 of co-pending Patent Cooperation Treaty international application having Serial No. PCT/US2006/25900 (the "PCT international application") filed on Jun. 30, 2006. This application claims priority to the PCT international application and to prior Great Britain (GB) national application having Serial No. 0519998.9 filed on Sep. 30, 2005, the priority of which was also claimed in the PCT international application. Both the PCT international application and the GB national application are assigned to Motorola, Inc.

FIELD OF THE INVENTION

The invention relates to access rights management for content items and in particular, but not exclusively, to generation of access rights rules for personal content items.

BACKGROUND OF THE INVENTION

Personal content ownership and access rights management is about providing users with the means to manage their personal content and share that content as they would any personal tangible content, such as pictures, personal notes, personal communications etc. Thus there is potential for the user to have some degree of control and responsibility over their own digital content.

The emergence and increasing popularity of communication systems such as the Internet, cellular communication systems and wired and wireless computer networks have led to a substantially increased distribution of digital content between users by means of data communication. For example, it is today commonplace for content items such as music and photos to be distributed directly via the Internet.

Furthermore, the generation, sharing and distribution of content by individual consumers has increased explosively and currently a large percentage of the population frequently generate digital content data in the form of for example digital photos, digitally encoded printed material (such as word processing document or PDF documents) or digitally encoded music.

As communication and information exchange increases with the potential to share more content in a digital format, a number of social, cultural and technical challenges have emerged.

For example, more and more applications use some form of metadata to perform some tracking of information and automation of certain types of tasks or to provide further information of content characteristics of the content item. For example, digital photos often comprise metadata indicating when the picture was taken and what parameters were used. A key problem for such systems is that users often are not aware that they are exposing further hidden information.

In terms of commercial content and asset protection, digital rights management (DRM) standards are being developed to enable the sharing and exchange of commercial content while restricting access and distribution appropriately.

However, techniques for protection of personal content are very limited. Encryption techniques exist that can secure content using a public key from a receiver and thus ensuring that only that receiver can decrypt the signal using their private key. However, such systems do not provide any further protection or assist the user in identifying the kind of information they are actually sharing. For example, some applications generate information about a document, associate tags and links to web pages that a user has visited, and in some cases an application may inadvertently make this data available with the content or even without the content.

In many jurisdictions, legislation is also enforced to protect the privacy of users. Such legislation differs between countries and may be difficult to enforce. Furthermore, it is not always possible to ensure that any data held about a user is accurate, used appropriately, protected correctly and is deleted, removed or updated according to the legislation, as well as moral and ethical requirements. Digital Rights Management standards provide means for defining permissions for dealing with commercial content. A system of rights management has been introduced by Microsoft™ and is known as Information Rights Management. This system is aimed at preventing sensitive information from being printed, forwarded, or copied by unauthorized people. Once permission for a document or message has been restricted with this technology, the access and usage restrictions are enforced no matter where the information is, since the permission to access an e-mail message or a document are stored in the file itself. Further information is available on the Internet at http://office.microsoft.com/en-gb/assistance/HA010397891033.aspx However, this system has a number of disadvantages. Mainly it is inflexible and limited in scope and requires specific access rights to be explicitly defined for the individual content item by a user.

Hence, an improved system for managing access to a content item would be advantageous and in particular a system allowing increased flexibility, improved accuracy, improved suitability for personal content items, reduced user interaction requirements and/or an improved access control would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus comprising: means for receiving a content item; a user preference model indicative of user preferences for content item access; rule generation means for determining a set of self-governance rules for the first content item in response to the user preference model, the self-governance rules being indicative of allowable actions for the first content item in other devices; means for including the set of self-governance rules with the content item; and means for transmitting the content item to a second apparatus.

The invention may allow improved management of access to content items. The invention may allow improved, facilitated and/or a more flexible control of the access to content items by a user and in particular by the owner or creator of the content item. The necessity for explicit and specific user definition of access rights can be reduced or eliminated. A content item can be distributed with a set of self-governance rules that defines how the content item may be accessed in different situations. This may allow a flexible distribution of content items wherein a flexible and dynamically determined access control can be implemented based on the received content item itself. Access permissions and rights that reflects the user's preferences may automatically or semi-automatically be determined. The invention may in particular facilitate access rights management for individual users without requiring them to explicitly define the access rights or without even being aware of these being determined.

The content item may specifically be a personal content item created by the user of the apparatus. The content item access may include content usage and content item sharing characteristics. This set of self-governance rules may be included in the content item by specifically including data in a data element, such as a data file, comprising the content item or by otherwise transmitting the content item and the set of self-governance rules to the second apparatus. The set of self-governance rules can comprise one or more rules.

The set of self-governance rules allows access rights to be dynamically determined at the second apparatus without requiring any additional information from the first apparatus. The rules are self-governance rules in the sense that they allow access rights to be determined from the combined set of the content item and set-of self-governance rules.

According to an optional feature of the invention, the user preference model is a privacy preference model indicative of privacy preferences for a user associated with the content item.

The invention may allow for improved control of access to the content item and in particular may allow access to be in accordance with privacy preferences for the user.

According to an optional feature of the invention, the apparatus comprises user input means and means for modifying the user preference model in response to a user input.

This may allow improved performance and access rights management. In particular, it may allow a user preference model to be generated that closely reflect the user's preferences and thereby may allow a set of self-governance rules that accurately reflects the user's preferences to be generated without requiring explicit or specific user input for each individual content item.

The user preference model may be generated from a default model that can be modified and amended in response to user inputs.

According to an optional feature of the invention, the rule generation means is arranged to generate the self-governance rules in response to a relative prioritisation of different parameters of the user preference model.

This may allow improved accuracy of the self-governance rules and/or may allow an effective consideration of the interrelation between different parameters affecting the generation of the self-governance rules.

The relative prioritisation can be achieved by applying different weights or significance to different parameters.

According to an optional feature of the invention, access user characteristics have a higher prioritisation than access context characteristics which have a higher prioritisation than content characteristics for the content item.

This may provide particularly advantageous performance in many embodiments. In particular it can allow accurate rights management that reflects the typical social preferences for human users.

According to an optional feature of the invention, the apparatus further comprises means for modifying the user preference model in response to a user preference determination for a second content item.

This may allow improved performance and improved accuracy of the determination of the set of self-governance rules. In particular, it may allow the set of self-governance rules to more closely reflect the user's preferences without requiring a detailed and explicit definition by a user. The user preference model can specifically be a learning user preference model that is dynamically updated to increasingly accurately reflect the user's preferences. The user preference model may be updated in response to previous determinations and user interactions for previous content items.

According to an optional feature of the invention, the rule generation means further comprises a policy model which is arranged to generate policy rules in response to the user preference model and the rule generation means is arranged to determine the self-governance rules in response to the policy rules.

This may allow an improved determination of the self-governance rules and/or can provide additional flexibility and/or facilitate implementation. Use of policy rules can allow or facilitate automation of preferences, validation of preferences and granularity of control of content. The use of both a user preference model and policy rules can allow a non-application specific implementation.

According to an optional feature of the invention, the policy model comprises means for validating a set of policy rules.

This may allow improved performance and an increased accuracy of the set of self-governance rules and/or may facilitate implementation. The dedication of the set of policy rules may for example comprise a verification of individual preferences or policies, verification of the consistency between individual preferences or policies and/or the detection of a conflict between different rules or policies.

According to an optional feature of the invention, the rule generation means comprises an adaptive model for determining the self-governing rules in response to a generation of self-governing rules for previous content items.

This may allow an improved accuracy of the determination of the set of self-governance rules and/or may facilitate implementation and/or improve the user experience and reduce the requirement for user intervention.

The rule generation means may be arranged to modify the adaptive model by inferencing from the processing of other content items.

According to an optional feature of the invention, the rule generation means is arranged to determine the self-governing rules in response to a content characteristic of the content item.

This may allow improved accuracy of the set of self-governance rules. In particular, it may allow a set of self-governance rules to be created which accurately reflect the user's preference for that specific content item.

According to an optional feature of the invention, the apparatus comprises means for detecting a discrepancy between a self-governance rule for the content item and a self-governance rule for at least one previous content item and means for generating a user alert in response to a detection of the discrepancy.

This may assist a user in maintaining a consistent policy for access to content items.

According to an optional feature of the invention, the content item comprises a plurality of content item elements and wherein the set of self-governance rules corresponds to different access rights for at least a first content item element and a second content item element.

The set of self-governance rules may comprise rules that allow a differentiated access to different content item elements. This may allow an improved access control and management to content items and may in particular provide increased flexibility.

According to an optional feature of the invention, the set of self-governance rules comprises relationship information for the plurality of content item elements.

The relationship information may for example be indicative of a logical data structure of the content item elements. For example, the content item may comprise a number of content item element organised in a hierarchical tree structure with some content item elements depending from or being subsets of other content item elements, and the relationship information may comprise data defining such a hierarchical tree structure.

According to an optional feature of the invention, the apparatus further comprises means for removing in response to the set of self-governance rules at least one of the plurality of content item elements from the content item before transmission to the second apparatus.

This may provide improved access management. For example, the means for removing can be arranged to remove personal data from a content item if the set of self-governance rules indicates that personal data should not be distributed to the second apparatus.

According to an aspect of the invention, there is provided a content item distribution system comprising: a first apparatus comprising: means for receiving a content item, a user preference model indicative of user preferences for content item access, rule generation means for determining a set of self-governance rules for the first content item in response to the user preference model, the self-governance rules being indicative of allowable actions for the first content item in other devices, means for including the set of self-governance rules with the content item, and means for transmitting the content item to a second apparatus; and the second apparatus comprising: means for receiving the content item from the first apparatus, means for extracting the set of self-governance rules, and restriction means for restricting access of the second apparatus to the content item in response to the self-governance rules.

The invention may allow improved content item access rights management and may in particular allow a content item to be distributed which comprises a set of self-governance rules that allows a second apparatus to independently and individually determine and control access to the content item.

According to an optional feature of the invention, the restriction means are arranged to allow access to only a subset of a plurality of content item elements of the content item.

The invention may allow improved content item access rights management. For example, the invention may allow a determination in the second apparatus of which content item elements can be accessed taking into account the current conditions and context at the second apparatus. For example, personal data of the content item may only be accessed by a second apparatus if it is currently used by an authorised user for the personal data.

According to an optional feature of the invention, the set of self-governance rules is context sensitive and the second apparatus comprises means for determining a context for an access to the content item and the restriction means is arranged to restrict access in response to the context.

This may allow an improved access right management for distribution of content items. In particular, it may allow a flexible system wherein a set of self-governance rules can be determined for the content item at the first apparatus without knowledge of the context in which the content item will be used. Furthermore, the access rights for the content item can dynamically and flexibly be determined at the receiving second apparatus depending on the specific current context.

According to an optional feature of the invention, the first apparatus comprises means for encrypting at least one content item element of a plurality of content item elements of the content item and the restriction means comprises decryption means arranged to decrypt the at least one content item element in response to the set of self-governance rules.

This may allow an improved access right management and/or may in particular provide additional protection, security and privacy for the content item.

According to an aspect of the invention, there is provided method of transmitting a content item, the method comprising: receiving a content item; providing a user preference model indicative of user preferences for content item access; determining a set of self-governance rules for the first content item in response to the user preference model, the self-governance rules being indicative of allowable actions for the first content item in other devices; including the set of self-governance rules with the content item; and transmitting the content item to a remote destination.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
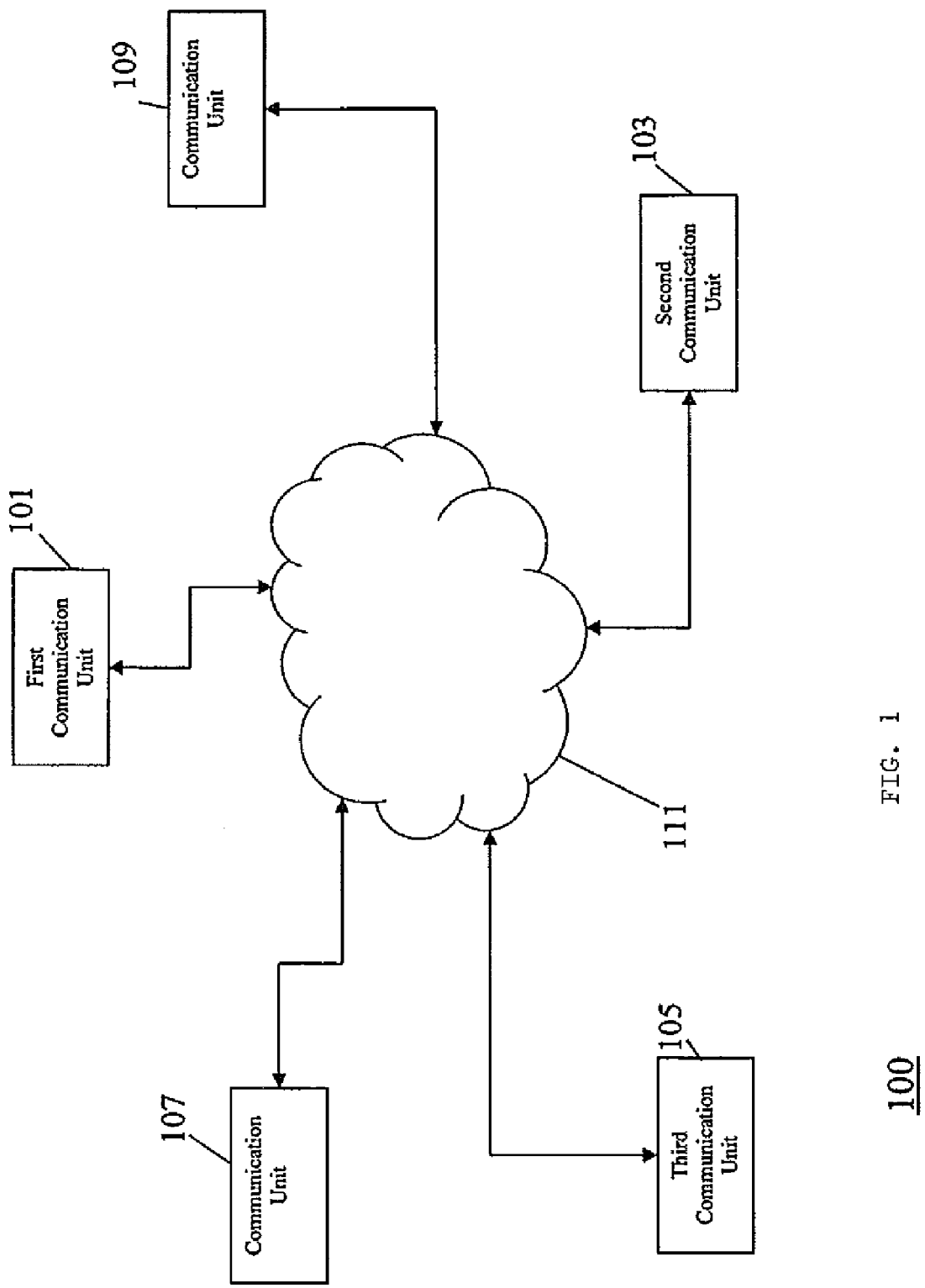
FIG. 1 is an illustration of a communication system comprising some embodiments of the invention.

FIG. 1 is an illustration of a communication system comprising some embodiments of the invention.

The communication system comprises a number of communication units 101-109 which can communicate with each other through an interconnecting network 111. For example, the communication units 101-109 can be remote stations of a cellular communication system and the interconnecting network 111 can be the fixed network of the cellular communication system. As another example, the communication units 101-109 can be personal computers communicating with each other through the interconnecting network 111 in the form of the Internet.

It will be appreciated that the invention is applicable to many other kinds of content item distribution elements and communication systems.

In the example, a first communication unit 101 is arranged to distribute content items to one or more of the other communication units 103-109.

Figure 2:
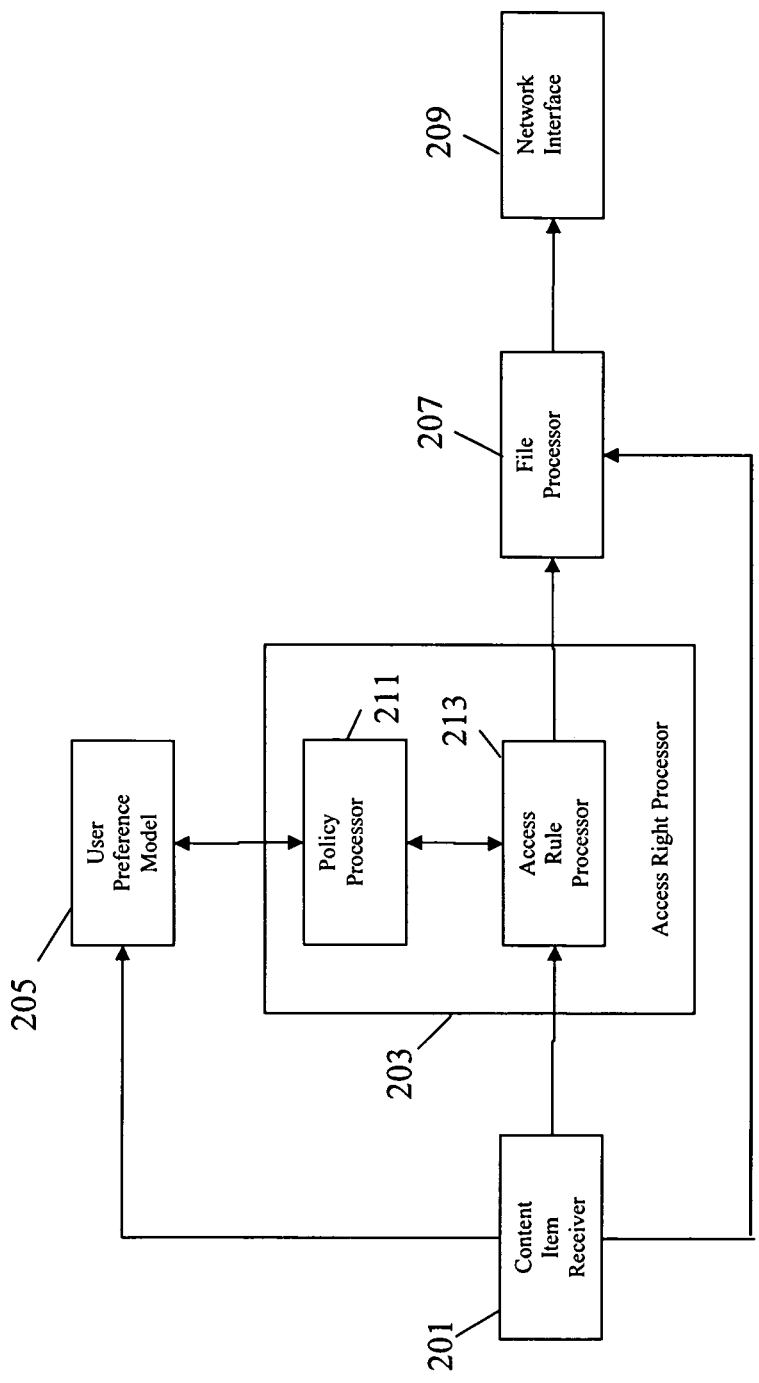
FIG. 2 illustrates an apparatus in accordance with some embodiments of the invention.

FIG. 2 illustrates the first communication unit 101 of FIG. 1 in more detail.

The first communication unit 101 comprises a content item receiver 201 which can receive a content item from an internal or external source, such as from a content item store of the first communication unit 101.

The content item may in particular be a personal content item which has been generated or created by the user of the first communication unit 101. For example, the content item can be a digital picture, audio encoded music or a text document.

The content item receiver 201 is coupled to an access right processor 203 which is arranged to determine a set of self-governance rules for the first content item. The set of self-governance rules will provide a description of the access rights for the content item which can be used by other communication units 103-109 to determine their allowed access to the content item. The set of self-governance rules can be very flexible and define very flexible criteria for how and when the content item can be accessed. For example, the set of self-governance rules can define which access is allowed depending on characteristics of the application, context, user, communication unit etc at the specific time of access.

The access right processor 203 is coupled to a user preference model 205 which in the specific case is a user privacy preference model. The user preference model 205 is in the specific example of FIG. 2 a learning model which is continuously adapted and updated to reflect the user's privacy preferences.

The access rule processor 205 is arranged to determine the self-governance rules in response to the user preference model 205. Specifically, for a given content item, the access right processor 203 will evaluate data received from the user preference model 205 which is indicative of the users expected preferences for the access rights of the content item.

The access right processor 203 is coupled to a file processor 207 which is arranged to include the set of self-governance rules with the content item. The inclusion of the self-governance rules with the content item is such that the self-governance rules are distributed together with the content data of the content item.

Specifically, the file processor 207 can be arranged to embed self-governance rules data in a content item data file. For example, for many audio encoding standards the self-governance route data can be embedded in the auxiliary or optional data fields.

The file processor 207 is coupled to a network interface 209 which is arranged to interface with the interconnecting network 111 in order to transmit the content item to one or more other communication units 103-109. In the following, the description will mainly focus on the transmission of the content item to the second communication unit 103.

It will be appreciated that in embodiments wherein the interconnecting network is the Internet, the network interface 209 may comprise a suitable modem whereas in embodiments wherein the interconnecting network is a fixed network of a cellular communication system the network interface 209 may comprise a suitable transceiver for communication over the air interface of the cellular communication system.

Thus, in accordance with the example of FIG. 2, the first communication unit is operable to determine suitable rules that can be used by other communication units to determine the access rights for the content item. A very flexible access right determination is possible based on the self-governance rules received with the content item and no additional or explicit access right information need to be provided or obtained from the first communication unit or elsewhere.

Furthermore, by using a user preference model, the first communication unit can determine, generate and define the self-governance rules automatically or semi-automatically without necessarily requiring any specific or explicit user input of the definition of access rights for the individual content item.

For example, many content items can comprise a number of different content item elements. For example, a digital picture may comprise the underlying picture in different quality levels, as well as automatically generated meta-data (such as information relating to when the picture was taken and the camera settings used therefor) and explicitly generated personal meta-data (such as personal comments added to the digital picture).

The self-governance rules can allow individual access rights to be defined for the different content item elements. For example the self-governance rules may specify that for a certain group of people, in a certain context and at a certain time full access is allowed whereas for another group of people and/or for another context and/or at another time, only access to the digital picture itself can be allowed.

The user preference model 205 is in the described embodiments a learning model that continuously adapts to the privacy preferences of the user.

Initially a standard default user preference model can be implemented. Such a user preference model can have default privacy preferences for a number of different predetermined characteristics of e.g. the content item. For example, a preference for an access of individual content types can be defined, e.g. for a music content item a preference for allowing access to anybody may be defined, whereas for a personal digital picture a preference for allowing access only to a group of users meeting a certain set of characteristics may be recorded.

The default user preference model can then be modified by the user. For example, the communication unit 103 can comprise a user input allowing a user to explicitly set various characteristics and parameters for the model. Specifically the user can specify a number of privacy preferences for individual content item types or even for individual content items.

Furthermore, the user preference model 205 is a learning model and the first communication unit 101 is arranged to continuously monitor the access rights and privacy settings which are determined for specific content items. In particular, the first communication unit 101 can monitor if a user explicitly changes a privacy setting for a content item which has been proposed in accordance with the user preference model 205 and if so the model can be updated accordingly.

It will be appreciated, that the user preference model 205 can be a very complex model that considers a large number of different parameters, characteristics and aspects of the content items as well as of other factors such as context characteristics, access user characteristics etc. A more detailed description of a possible implementation of the user preference model 205 will be provided later.

In the embodiments of FIG. 2, the access right processor 203 furthermore implements an adaptive model used to determine the self-governance rules. The adaptive model is in the example continuously modified and updated in response to the determination of self-governance rules for various content items.

For example, if a certain privacy rule has been determined for a number of previous content items having a first common characteristic, the model is adjusted to consider this privacy rule as a likely contender for any content item having the same characteristic. If a new content item is received that has a number of characteristics which match a number of characteristics having identified potential privacy rules, the model will furthermore comprise functionality for taking the relations and priorities of these different characteristics into account.

As a simple example, a content item having two characteristics that match previously determined privacy rules can be evaluated by the model resulting in for example both of these privacy rules being included in the set of self-governance rules, the inclusion of only one of the privacy rules or even in the exclusion of both of these privacy rules.

A more detailed description of a possible implementation of such a self-governance rule model will be described later.

In the example of FIG. 2, the access right processor 203 comprises a policy processor 211 as well as an access rule processor 213. In the example, the policy processor 211 provides an interface layer between the user preference model 205 and the self-governance rule model implemented by the access rule processor 213.

In the example, the policy processor 211 thus comprises a policy model which is arranged to generate policy rules in response to the user preference model. The access rule processor 213 is arranged to determine the self-governance rules in response to the policy rules. The use of a policy model provides for utilization of the user preference model 205 in a flexible way and in particular allows non-application specific processing.

The policy processor 211 determines policy rules for the content depending on the user's preferences as indicated by the user preference model 205. The policy processor 211 can provide a range of features as described in more detail later but can specifically validate different policy rules determined from the user preferences. Such validation includes consistency checking of the individual rules, verifying that rules are consistent with each other and detecting and removing any conflicts between these.

Furthermore, the policy processor 211 can provide for a prioritisation between different preferences and/or characteristics. For example the policy processor 211 can apply a weighting to different preferences or rules thereby allowing these to be evaluated relative to each other.

For example, social behaviour of typical users indicates that privacy preferences depend significantly on who is allowed to access the information, to a lesser degree on the context in which the information is accessed and to an even lesser degree on what the nature of the content is. Therefore, in some embodiments the policy processor 211 prioritises the access user characteristics higher than context characteristics which is again prioritised higher than content characteristics for the content item. This prioritisation can for example be achieved by applying a weighting to the individual parameters or preferences.

In some embodiments, the access rule processor 213 is furthermore arranged to monitor the consistency of the determined access rights. In particular, the first communication unit 101 can comprise means for receiving a user input which allows the user to explicitly influence the self-governance rules and the privacy settings which are determined for the individual content item. For example, the first communication unit 101 can comprise means for a user to override or modify any data generated by the user preference model 205, policy processor 211 and/or access rule processor 213. As another example, the first communication unit 103 can comprise means for the user to explicitly set an access right preference for the individual content item.

The access rule processor 213 can in such cases detect that a self-governance rule determined for the current content item use different than a self-governance rule which has been determined for a very similar content item. In such cases, the access rule processor 213 can cause the user to be alerted, for example by displaying the difference on a suitable display of the first communication unit 101 and asking the user to confirm or reject the new preference.

This feature can in particular provide a very consistent setting of access rights for content items and can substantially facilitate the access rights management for the user.

As previously mentioned, the content item can itself comprise a plurality of different content item elements, such as the content data itself and automatically or manually generated meta-data for the content data. These content item elements can be structured in a hierarchical tree structure indicative of the interdependence between the different content data elements. In such cases, and as will be described in more detail later, the access rule processor 213 can include relationship information for the plurality of content item elements in the set of self-governance rules.

Specifically, the relationship information can comprise a definition of the hierarchical tree structure and an indication of which self-governance rules corresponds to which node of the tree structure.

Furthermore, in some embodiments, the access right processor 203 is arranged to control the file processor 207 to remove one or more content item elements (either fully or partly—e.g. only some data values of a given content item element) depending on a set of self-governance rules determined.

For example, the access right processor 203 can for a specific content item determine that the user prefers not to include any personal data, such as identity user data or manually added meta-data, with the content item. In such cases, the file processor 207 can explicitly remove the data from the content item. Such a feature can provide improved privacy and an enhanced user experience.

In the example of FIG. 1, the content item is transmitted from the first communication unit 101 to the second communication unit 103.

Figure 3:
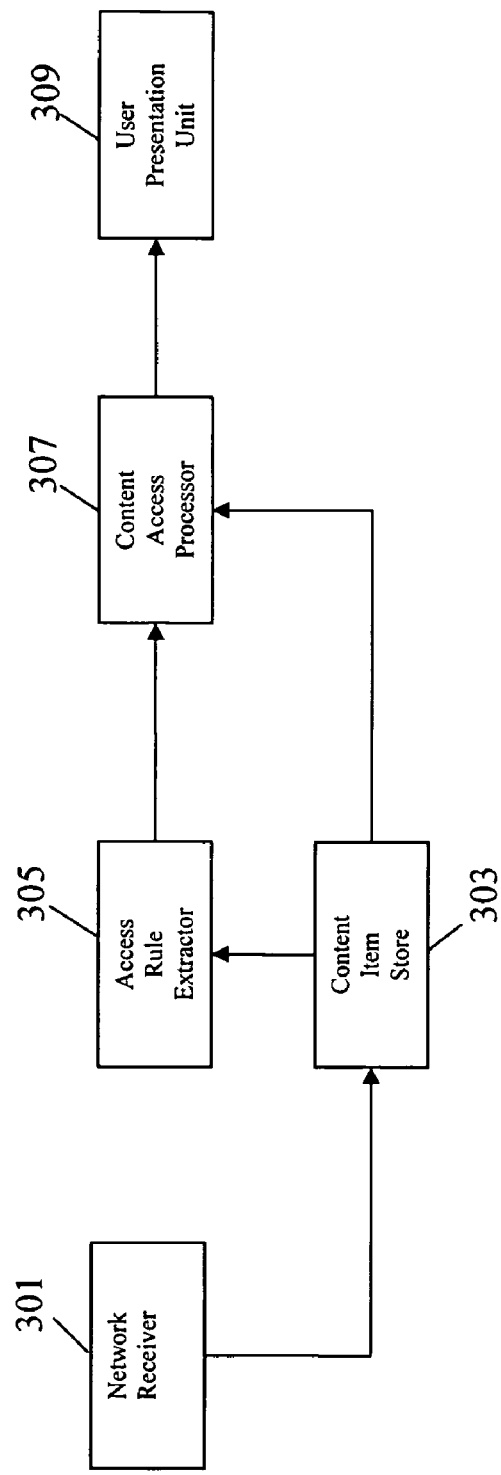
FIG. 3 illustrates an apparatus in accordance with some embodiments of the invention.

FIG. 3 illustrates the second communication unit 103 of FIG. 1 in more detail.

The communication unit 103 comprises a network receiver 301 which receives the content item from the first communication unit 101. The network receiver 301 is coupled to a content item store 303 wherein the content item is stored.

The second communication unit 103 furthermore comprises an access rule extractor 305 which extracts the set of self-governance rules from the content item. The access rule extractor 305 is coupled to a content access processor 307 which is fed the set of self-governance rules.

The content access processor 307 is coupled to the content item store 303 and is arranged to control access to the content item in accordance with the requirements of the set of self-governance rules. In particular, the content access processor 307 is arranged to restrict access to the content item unless this access is allowed in accordance with the set of self-governance rules.

For example, the content item can be a digital photo which a user of the second communication unit 103 is seeking to display on a suitable display of the second communication unit 103. The request for access to the digital photo can be evaluated by the content access processor 307 taking into account for example the context of the access, the accessing application and/or an identity of the user requesting the access. These parameters can be applied to the set of self-governance rules by the content access processor 307 and only if this results in a determination that access is allowable will the content access processor 307 access the content item store 303 to retrieve the requested digital photo.

In the example of FIG. 3, the content access processor 307 is coupled to a user presentation unit 309 which can pretend the content item to the user. In the specific example, the user presentation unit 309 can comprise a display on which the digital photo can be presented.

As mentioned previously, the content item can comprise a plurality of different content item elements which are individually accessible. In such embodiment, the content access processor 307 can be arranged to determine a graduated access right wherein access is allowed to one or more content item elements whereas it is denied for one or more other content item elements. For example, the user of the second communication unit 103 may be allowed to be shown the picture but may be prevented from accessing any annotations or additional meta-data.

It will be appreciated, that the set of self-governance rules can be context sensitive such that different access rights can be determined depending on the context of the individual access. For example, access may be limited in terms of time or the application accessing the content item. In such embodiments, the content access processor 307 can first determine a context for the specific access and subsequently evaluate the set of self-governance rules for the specific context. This may allow a highly flexible access rights management.

In some embodiments, the first communication unit comprises functionality for encrypting the content item fully or partially. In such embodiments, the content access processor 307 can comprise functionality for decrypting the encrypted data but may only proceed to do this if a suitable access right is determined.

The above description provides an overview of the system of FIG. 1. In the following various aspects of features of the system will be described in more detail.

In the system the self-governance mechanism provides a method of applying privacy preferences to content that attaches the way the user would prefer the content to be used and dealt with. Specifically, the system can provide:

1. A means by which to capture the user's privacy preference for how content can be used. This is done by the application of a policy model. This includes, for example, removing content from a content collection if a policy attached to that content states that this should not be shared or copied in a particular way e.g. a preference stating "never share my personal annotations" will remove all personal annotations before providing access to or delivering the content. The user can be warned of such an action and decide to override that action.
2. a mechanism for applying the user's preferred policy model to content and attaching that context to the content so that the user's preferred use of the content can be referenced and reasoned about by the content itself
3. a method to assist in preventing access to content in ways that it was not intended The details of the system, will be described using a content item in the form of an ACE (Autonomous Content Entity) as is known from the ACEMEDIA study (ref. e.g. http://www.acemedia.org/aceMedia where the definition and use of an ACE are defined in a number of papers and web pages. An ACE can contain content or references to content that may be visual e.g. like pictures, audio like music or descriptive like metadata or personal annotations/messages. It is not limited to one piece of content and can contain collections of content which can either be atomic (not dividable) or sets of ACEs.

Figure 4:
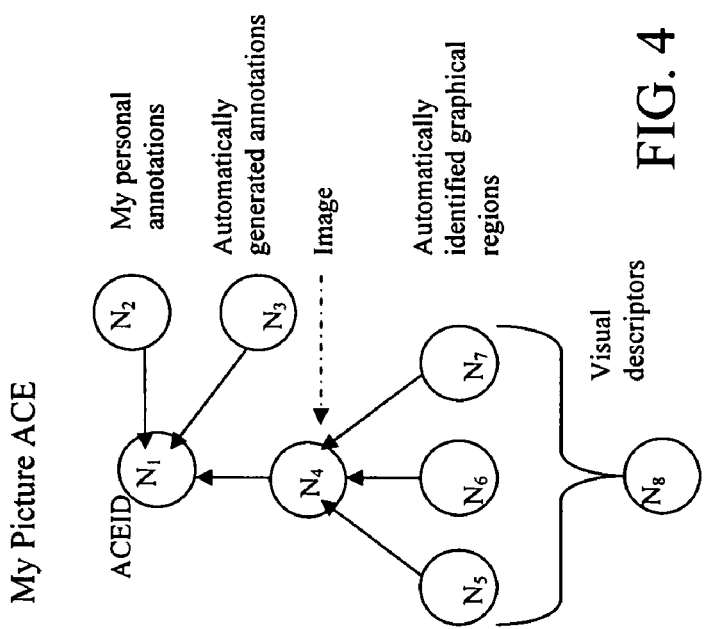
FIG. 4 illustrates an example of a hierarchical tree structure for content item elements of a content item.

In the example, each ACE has a set of content item elements that can be thought of as a hierarchical structure. An example for a digital photo of such a structure is provided in FIG. 4.

An ACE when created supports the concept of a collection of atomic content that is that each ACE contains a collection of content items that can not be decomposed further. Within an ACE the concept both atomic content and complex content (some form that can be further decomposed) exists. Whether or not a specific ACE contains both types is dependent on the function of a particular ACE.

Each ACE that is created has also a unique identity ACEID. The ACE may be empty of specific content e.g. pictures or metadata and may just be a framework that is to be populated with content at some point in time.

In the following further details of the operation of the access rights processor 203 is provided.

Figure 5:
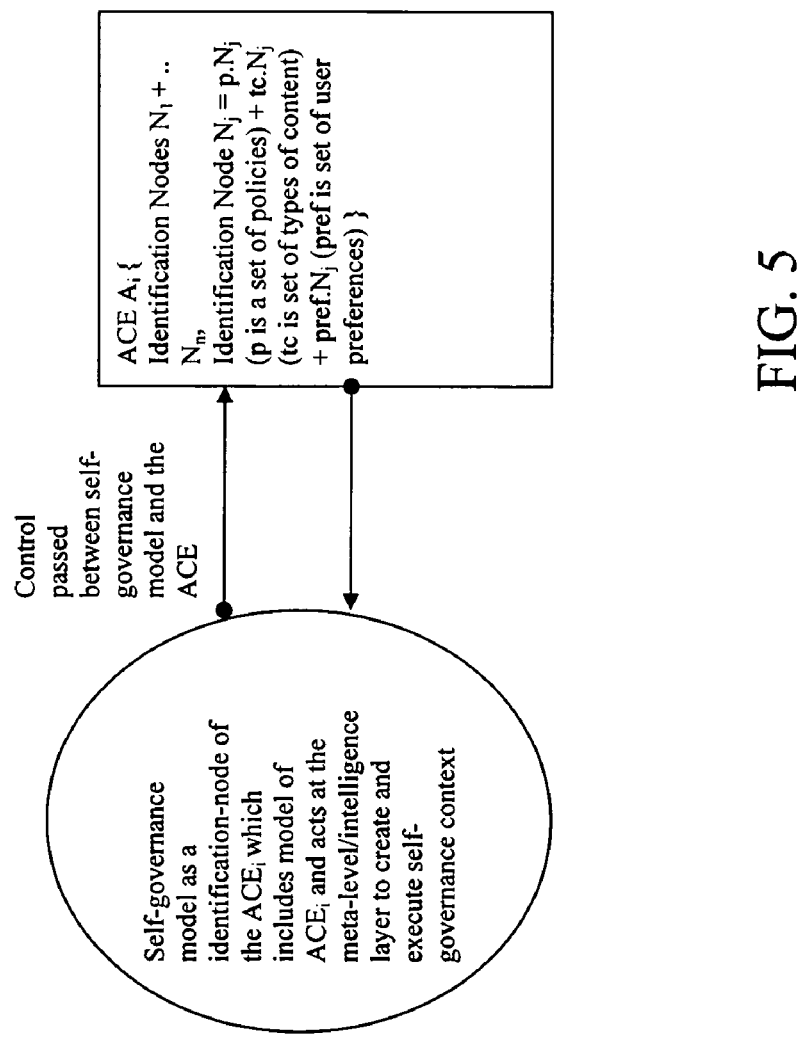
FIG. 5 illustrates an example of a self-governance model for a content item.

In FIG. 5, a simple model is defined in terms of nodes (each node has a set of policies and type of content and user preferences related to the specific policies). The self-(governance) model acts as a meta-interpreter for ACE and is defined in terms of an ACE, in this case identification nodes that have a computational context that is created by the relevant selection of policies that are based on content type and preferences. The preference includes those related aspects of the environment of device and target community.

Hence an ACE A is defined as having a set of Identification Nodes N. Each Identification node has a set of policies, a type of content, and set of preferences which are explicit to and shared with the self-model. Hence in defining an ACE: $A_i = N_1 + .. N_n$, where $N_j = i.N_j$ (p is a set of policies)+ct.$N_j$ (ct is a set of content types)+pref.$N_j$ (pref is a set of preferences). The self-model, which in this context provides the basis for self-governance, is defined as a node belonging to the set of identification nodes N, and as such is part of ACE $A_i$.

It is possible to construct a self-model external to an ACE, as if the self-model is not part of the ACE. This means that the meta level can operate by either observations without affecting behaviour or affecting the behaviour as an interpreter affects the program it is running. However, once the self-model is embedded within the ACE, the ACE can influence behaviour through the self-model and vice versa thus achieving self-governance for supporting computational autonomy.

Defined in the model of self-governance is the context of operation set by the associated policies, which express concerns about the self-model itself or about other identification nodes' context. It contains at one level what the self-model knows. The operation of the self-model has three parts:

Primitive level: this is triggered by an identification node or set of identification nodes which requires only local context to provide changes to the identification node and related content and can be thought of in terms of a) normal computation/reasoning level of the system, b) may be handled by the straight forward execution of the rules associated with the identification nodes but changes certain relationships/references which do not conflict but makes changes external to the self-model and the ACE context, and/or c) a form of error handling that requires the self-model.

Complex set of identification nodes interactions: This is triggered when more than just the identification node may be affected and consistency checking is required. This involves a set of heuristics to permit priorities of coordination and consistency checking within an ACE. This in terms of the ACE and self-governance is grounded by the policy model and context of personal privacy preferences and defined set of self-governance rules.

Self-model: To reason about the self-model, that are all aspects, priorities, constraints explicit to the self-governing system, which may be triggered by either of the above levels or through some computational state explicit only to the self-model e.g. conflict between the contexts provided by the identification nodes and the environment for execution. The result may be to change even the self-governance model itself permanently, to cause a different configuration of identification nodes (removal or modification of content) at run time from then on (including the self-governance model changes).

For the self-model to operate as defined above requires a meta-level inference functionality in which to define the type of operations and handling of the identification nodes and their context. At one level it is operating as a meta-interpreter, but the language is more complex and the system itself is a set of programs that are expected to operate at some problem solving level.

The policies, preferences and content type define the self-representation of an ACE at some general level. The self-relativity, or when the system will reflect, is defined at various levels of an ACE's architecture. The causal connection at the self-model has been defined to operate at three different levels (see above). To generate such a framework means that an ACE operates another level; a speculation/verification model. This allows an ACE, that has self-governance capabilities, to run part or all of the computation of itself in another mode of operation. This model allows an ACE to see the computational effects of the changes it is currently considering. It is possible to keep different partly configured states that the ACE can load and run when necessary or return to old, or change to potentially new, self-governance configurations. In this way an ACE can control a much broader scope of its own computation.

Self-governing rules provides a particular context for self-configuration in terms of the privacy policies. Although the policy mapping can be done within the constraint schema provided above this alone can not be used to do progressive reasoning required for the self-governing management of privacy policies.

The following outlines the creation of a self-governing rule
createSelfGoverningRule (PolicyContext, typeofContent, UserPreferences)
    Consistency←solve(PolicyContext)
    If consistency=Unusual then validate with user
        IdentificationNodes←Identification (PolicyContext, typeofContent, UserPreferences)
        GrantingRights←GrantingRights (PolicyContext, typeofContent, UserPreferences)
    Self-governingRightsObject←
        ExecuteProtection (PublicKey, GrantingRights, IdentificationNodes, TypeOfContent)
SelfGoverningRule←
    createSelfGoverningRule
    (Self-governingRightsObject, PrivateKey, IdentificationNodes, GrantingRights)

The consistency checking can be done via a constraint reasoner (to be described later) as the schema allows rules to be applied the degree of consistency checked can be modified. If, for example, policies show unusual conflicts between content and metadata rights or different access rights being provided that greatly differ from a previous sharing of content, then the system presents a warning to the user. Granting rights and the type of rights come from a particular policy context which is based on the type of content and user preferences. The constraint reasoner validates that the granting of the rights are possible under the policies that exists about the user and provides a set of GrantingRights, where each specific right has a context.

The SelfGoverningRightsObject is where content (metadata and content) is encrypted with the public key creating a rights object that encodes also the IdentificationNodes and GrantingRights. The creation of the SelfGoverningRule is created based on the priority of the type of content rights being enabled. This is determined by matching the grantingRights with the IdentificationNodes (particular pieces of content) to provide a context for the decryption theory which includes the order of extraction. The matching theory context form the IdentificationNodes and the specific encrypted content and metadata provided are decrypted accordingly using the private key.

The creation of the self-governance context to generate the self-governance rules as the operational semantics of self-governance requires a set of specific context constraints and self-configuration context. The creation of self-governance context can be based on the following types of knowledge-base inputs:

1. Identification node context, which is a collection of nodes (see section 3.3. to see the definition of a node). Each node or set of nodes has associated with it a policy or set of policies, preferences, and content type.
2. Relation between different content nodes, which define the priority of nodes and can be determined by the context of a specific or set of policies and the set of priority rules
3. Self-configuration context, which is defined by a set of configuration policies as part of the system. These are defined as integrity checks to assist any autonomous system from having access to different configuration contexts to verify the rights to the content.

The self-governance context is stored in a knowledge-base (which is a collection of facts and rules for problem solving that can be distributed or centralized both physically and logically). The self-governance contexts are written in the following form:
Self-govern→Context Where Self-govern is an atomic formula and Context is a "complete" conjunction of all the contexts the knowledge-base should satisfy when Self-govern holds. Operationally, if an input matches Self-govern (unifies with Self-govern) then the Context is "triggered" (resolved with the inputs) and an appropriate instance of the Context (resolvent) is added to the current self-govern rule. This enables the progressive reasoning about whether or not a particular content associated with the context can be un-packed (decrypted or displayed or given access to the system etc.). Thus the self-governance rule is define as:
SelfGovernRule(InKB,InSelfconfiguration,InSelfGovern, OutKB,OutSelfConfiguration,T)←SelfGovern(KB, InSelfGovern→Context)
  ∧OutKB=(InSelfGovern∧InKB)
  ∧OutSelfConfiguration=(Context∧InSelfconfiguration)

Here the SelfGovernRule predicate expresses the relationship that holds between the states of the knowledge-base in terms of the self-governance context and the self-configuration context before and after observing the context of InSelfGovern at time T. No input would result in true being returned for selfGovern, such that context returns true.

The SelfGovern rule defines the context for evaluating and creating the context necessary for progressively reasoning about a particular piece of context about some content and to determine at each inference point whether or not an ACE (or any computational entity requiring the property of self-governance) can continue to proceed with a particular goal or task. However, there is more context than just the process of governance context to consider when evaluating whether or not a particular computational context still has the rights or permissions to some information and also to enable the capabilities of the entity to reason whether or not some piece of content can be shared, unpacked or viewed etc. based on the privacy context.

In order to do this a meta-rule is determined that unifies the different context of the self-governance with the context of self-configuration. The self-configuration context may be simply to apply just encryption to all content or may exploit other distributed knowledge inferencing strategies. The self-governing meta-rule is formulated as:

(1) MetaSelfGovern(KB,SelfConfiguration, InSelfGovern.InSelfGovernRest, try(PolicyContext, Result).OutSelfGovernRest,T)←

(2) SelfGovern(KB,Selfconfiguration,InSelfGovern,KB$^\nabla$, SelfConfiguration$^\nabla$,T)

(3) ∧validate(KB$^\nabla$,SelfConfiguration$^\nabla$,SelfConfiguration$^{\nabla\nabla}$,SelfConfigurationPolicy)

(4) ∧consistent(SelfConfigurationPolicy,Resource) ^tryPermission(KB$^\nabla$SelfConfiguration$^{\nabla\nabla}$,try(PolicyContext,Result),KB$^{\nabla\nabla}$, (5) SelfConfiguration$^{\nabla\nabla\nabla}$,T+Resource+MetaSelfGovern) ∧MetaSelfGovern(KB$^{\nabla\nabla\nabla}$,SelfConfiguration$^{\nabla\nabla\nabla}$, (6) InSelfGovern Rest, OutSelfGovernRest,T+Resource+MetaSelfGovern)

Each part of the metarule is described as follows:
(1) MetaSelfGovern is the metarule, which takes the following: a knowledge base, SelfConfiguration context, the SelfGovern context which is spilt into the current part of the SelfGovern context to be analyzed at this point of the inference context and the Rest to be processed, the try(PolicyContext, Result) is a rule which is defined below to determine if the permission of a particular policy for the particular piece of content still holds. The OutSelfGovern provides the context for the next part of the self-governance inference.
(2) SelfGovern applies the rule as defined previously (see general definition)
(3) Validate checks the context of the self-configuration context and returns self-configuration policy to be checked for consistency and resources.
(4) Consistent checks the consistency of the policy and resources. Here the configuration may just be to apply certain encryption to the content or may include other knowledge management strategies.
(5) tryPermission predicate is defined below. What is interesting is the tryPermission rule context for the try(PolicyContext, Result) is done in the context of speculation. As the selfconfiguration context is applied to the context of a permission to be evaluated in the context of a future configuration requirements. This means that permissions will be enabled or prevented by looking ahead at the policy permissions and the environment conditions that should hold throughout a set of computations. This provides the potential to system to apply self-management of content (in this case to the context of privacy) to boarder computation and thus offer more protection or indicators about current context of the inference.
(6) MetaRule cycles until some condition is met. The termination rules follow those of SelfConfiguration and use of meta-interpreter.

tryPermission predicate analyses the policy context for the selfGoverning rule. It checks ahead to validate that the SelfConfiguration context holds for both the current status and next status to determine whether a permission can be executed. There are three cases:

1. The context holds true for the permission to be enabled. The system executes the permissions
2. The context does not hold true for the permission to be executed. This fails. This means that particular content and any related content that inherits those permissions will also fail in execution so this part of the context is removed from the remaining inference context for the metareasoner.
3. There is no such permission and hence in the privacy rights management this is the same as point 2 being reached. Only if the system holds some form of recover configuration from the self-configuration policy can another action be considered.

The tryPermission predicate is defined more formally as follows:
tryPersmissions(KB,SelfConfiguration,try(PolicyContext, Result),KB$^\nabla$,SelfConfiguration$^\nabla$,T)←
evaluatePolicyContext(SelfConfiguration,PolicyContext, Rest,AlternativeConfiguration,T)
∧Result=success
∧SelfConfiguration$\nabla$=Rest
∧KB$^\nabla$=(do(selfGovern,PolicyContext,T)∧KB)
tryPersmissions(KB,SelfConfiguration,try(PolicyContext, Result),KB$^\nabla$,SelfConfiguration$^\nabla$,T)←
evaluatePolicyContext(SelfConfiguration,PolicyContext, Rest,AlternativeConfiguration,T)
∧Result=failure
∧SelfConfiguration$^\nabla$=AlternativeConfiguration
∧KB$^\nabla$=(do(selfGoven,rejectPermssion(PolicyContext)T)
  ∧KB)
tryPersmissions(KB,SelfConfiguration,try(nil,nil),KB$^\nabla$, SelfConfiguration$^\nabla$,T)←
¬∃PolicyContext,Rest,AlsternativeConfigurations
evaluatePolicyContext(SelfConfiguration,PolicyContext, Rest,AlternativeConfiguration,T)
∧SelfConfiguration$^\nabla$=alternativeConfiguration
∧KB$^\nabla$=(do(selfGovern,AlternativeConfiguration,T)∧KB)
evaluatePolicyContext(SelfConfiguration,PolicyContext, Rest,AlternativeConfiguration,T)←
SelfConfiguration≡(do(selfGovern,PolicyContext,T)∧ Rest)∨AlternativeConfiguration Here the SelfGovern rule is created at runtime to validate the permissions within a configuration of system at some point in time T. Time can be explicitly modeled or implicitly implemented through causal connection of the inference system. Hence a delta configuration change to context is achieved because the PolicyContext is reasoned about with respect to the current ownership rights status of the content with respect to the conditions in which the ACE is executing e.g. device context, person context, application context etc.

The rejectPermission means to remove access to the content as described and linked to by the PolicyContext. How this condition is dealt with is application dependent. The initial grounding rules and priorities provided here can be changed with respect to an application. However, to apply self-governance to the content requires some definition of when to apply permissions and when to reject these.

The calls to the predicate evaluationPolicyContext in the first two clauses select one branch of the self-configuration of the reasoning with respect to the policyContext and the permissions to the relevant content. PolicyContext becomes unified with the permissions to be enabled. Thus try(PolicyContext, Result) means that Result becomes instantiated and available to the metareasoner to include in the context of selfGovernance.

If the result of executing PolicyContext is success, then the content is committed to the permissions. The evaluatePolicyContext predicate combines committed choice when permissions succeed, with reasoning contexts when the permissions could fail. Thus this means that when evaluating personal content ownership rights then the system can incrementally un-pack content selectively and it can also revoke the permissions if a subsequent configuration indicates a severe problem that creates a particular priority for removing access to that content.

Also, it is worth noting that the branch do(selfGovern, PolicyContext,T)^Rest whose first set of conditions and permissions are selected and attempted to execute within a configuration context within time T, represents a partial evaluation. This enables the possibility to revoke a permission later on if an evaluation context changes significantly for example. Rest contains the remaining self-configuration context for determining the rest of the solutions for enabling permissions and obligations.

The information which makes up the specifics of the PolicyContext is dependent on particular applications, user preferences and the type of content. The general context is captured in FIG. 2. Below the PolicyContext is described in more detail. The policy context defines the selfgoverning rule and the selfconfiguration context defines how the self-governance can be applied.

The identification node context
{nodes($x_1 \ldots x_n$), Policies($P_i \ldots P_j$), Preferences
(Pref$_m \ldots$ Pref$_p$),
IDC
ContentType($CT_j, \ldots, CT_k$)}

The relation R between the different contexts is capture through the definition of policies and priorities and can be expressed as follows:
∀PriorityRules Pr
{nodes($x_1 \ldots x_n$), Policies($P_i \ldots P_j$),Preferences(Pref$_m \ldots$ Pref$_p$), ContentType($CT_j, \ldots, CT$)}
→RelationsR($R_{pr} \ldots R_{pr}$)

The selfGovernanceRule context is defined by the Identification Node context, the Relations defined in terms of the priorities and the SelfConfiguration strategy and uses encryption techniques for particular types of content. When encryption is used then a SelfGoverning rights object is required, which also includes the decryption strategy but also includes configuration contexts that must be matched to the self-governing rights object to enable any decryption.

The first step in creating self-governance rights object for the ACE is the identification of the nodes (that is the atomic content and complex content that is applicable to that ACE). The need to decompose an ACE down to its atomic components is dependent on the policy model to be applied.

The selection of a particular ACE or the creation of an ACE will be dependent on the user application task e.g. holiday photo collection, family party video etc. Once an ACE is selected or created and the relevant content collection is referenced in some way then all of the content within the ACE needs to be identified down to the atomic level.

When identifying all content within ACE I the type of content are also identified and node for each piece of content is created and notion of the ACE content tree is created (see FIG. 1).

In the following, more detail in the user preference model 205 which in the specific example is a personal privacy preference model will be provided. The personal ownership rights are defined in terms of access rights based on some context. The concept of access rights are well understood in the area of privacy, security and digital rights management.

Defining access rights based on sharing content with anonymous and known communities includes:
Declaring access rights to share on an individual basis
Declaring access rights to share with known groups or communities e.g. friends, family, work colleagues, customers, suppliers etc.
Declaring access rights to share with an anonymous community e.g. internet
Defining access rights based on a specific environment:
Declaring rights to a physical location e.g. work, home, public transport etc.
Declaring rights for a particular device e.g. personal device, friend's device, work device etc.
Defining access rights to specific Content include:
Declaring access rights to a specific piece of content (image, video, music clip, collection)
Declaring access rights to a specific application category of content
Declaring access rights to specific content based on location
Declaring access rights to specific content based on person identity
Declaring access rights to commercial content
Defining access rights to specific Metadata include:
Declaring access rights to automated metadata through content analysis
Declaring access rights to automated personal metadata
Declaring access rights to manually entered metadata
Defining actions for received content include:
Sender's identity
Type of content being received
The type of access rights a user may want to declare are:
Don't share any of my personal annotations
Ownership to remain with originator
Close friends to view and copy
Friends view only
No anonymous viewing
Throwaway "catch" the moment (automatic delete after viewing)

The user can define privacy policies for any content that they either own or have the rights to attach a policy. The rights to someone else's content that a user changes may mean that only certain aspects of the content can be changed e.g. a user may be allowed to send some else's content to be viewed by others, while they may have the rights to copy the content.

Each privacy policy about some content is based on three core policies about the content, metadata and sharing policies of the user. A number policies are defined that provide the framework for the privacy policy system along with the constraints priorities and the aspects of granting permissions.

1. An example of a General Personal Privacy Ownership Policy: (where the user owns (As full ownership and rights) the content). The example provided uses the policy language and model provided by http://www.c-s.umbc.edu/~lkagal1/rei/. It would be possible to use other policy languages.

| Policy property | value | description | Comments |
| --- | --- | --- | --- |
| Policy ID | ACERightsPolicy | Each ACE can be assigned at creation time or later the rights to the content and metadata | |

-continued

| Policy property | value | description | Comments |
| --- | --- | --- | --- |
| Context | OwnerOfContent | The user who is owner of the content has the rights to determine the conditions of use by other users and devices and ACEs | |
| Context | TypeOfContent | Either individual Image, metadata and/or collection (at least one image and one piece of metadata) | This invokes the policies that user has defined or default policies of the system about images, metadata and personal annotations. |
| Grants | GrantingRightsToContent | The granting is applied to an object. The object may represent a person, group and/or device. | This requires consistency checking for how the user would usually Grants Rights for a particular type of context. This information is defined in the set of policies about specific content, metadata and people |
| Metapolicy | MetaPolicyPriority | Content which is commercial conditions in any collection takes precedence over content which is personal. | Here a collection of content may have a particular user policy e.g. that the collection (content and metadata) must always remain as a collection. In this case the most specific permission constraint will apply e.g. no viewing by anyone other than the user may apply to one picture and as used by the DRM technology this will be applied to all content. |
| Rulepriority | HighestPriority | Priority is given to each type of constraint (see constraint table). The user can change these priorities either per application, content type etc. or in general. | This deviates from the original policy language intention but provides the point of convergence with the DRM Rights Expression Language. |
| Imports | CorePolicyPriorities | Defaults are used. These maybe modified by the user. | |

The rights expression language about permissions and conditions provides the necessary primitives for the granting, metapolicy, rule priorities and realisation of specific constraints for privacy model.

Granting Rights: There is one specific value to the policy language of granting and that is GrantingRightsToContent. The realisation of the action of granting are provide in the following table. This builds directly on the DRM rights expression language for permissions (see ODRL reference link Open Digital Rights Language ODRL http://odrl.net/ and Rights expression language used by OMA standards http://xml.coverpages.org/OMADRM-RELv20-20040420.pdf for more details about granting rights).

| Granting Rights Action | Type | Description | Application |
| --- | --- | --- | --- |
| Usage | Display/view, print, play, execute, browse | Indicates a set of methods in which content can be consumed (this can be applied to content (images, video etc.) and/or metadata) | Granting usage type is to an object entity, which represents a person (or group of people) and/or an environment (device or ACE or application) |

| Granting Rights Action | Type | Description | Application |
|---|---|---|---|
| Reuse | Modify (edit), Excerpt, Annotate, Aggregate | Indicates a set of operations in which the content can be utilised. | |
| Transfer | Give, Lend, Lease, Sell | Indicates a set of procedures in which rights over an asset can be transferred | |
| Asset Management | Move, Duplicate, Delete, Verify, Backup, store, Save, install, uninstall | Indicates a set of digital asset management operations | |
| Exclusivity | | Granting permissions is confined to nominated parties and/or environment about some content | |

The policy processor 211 can specifically comprise a constraint reasoner which validates the generated policy rules. An exemplary constraint reasoner is described in the following.

A Constraint Satisfaction Problem is characterized by:

a set of variables $\{x_1, x_2, \ldots, x_n\}$, for each variable $x_i$ a domain $D_i$ with the possible values for that variable, and a set of constraints, i.e. relations, that are assumed to hold between the values of the variables. [These relations can be given intentionally, i.e. as a formula, or extensionally, i.e. as a set, or procedurally, i.e. with an appropriate generating or recognising function.].

The constraint satisfaction problem is to find, for each i from 1 to n, a value in $D_i$ for $x_i$ so that all constraints are satisfied.

A CS problem can easily be stated as a sentence in first order logic, of the form:

$(\text{exist } x_1) \ldots (\text{exist } x_n)(D_1(x_1) \& \ldots D_n(x_n) \Rightarrow C_1 \ldots C_m)$ A CS problem is usually represented as an undirected graph, called Constraint Graph where the nodes are the variables and the edges are the binary constraints. Unary constraints can be disposed of by just redefining the domains to contain only the values that satisfy all the unary constraints.

Simplified description of backtracking schema's top level is given as follows:

procedure Solve (Unassigned—Variables)
  if UnassignedVariables=0 then return solution
  Var←ChooseBestVariable (UnassignedVariables, VariableOrderingRules)
  UnassignedVariables←UnassignedVariables−{Var}
  PossVals←DeterminePossibleValues (Var, PruningRules)
  Repeat until PossVals is empty
    Val←ChooseBestValue (Var, PossVals, ValueOrderingRules)
    PossVals←PossVals {Val}
    if ForwardChecking OR the Constraints on Var are satisfied by Val
    then Assign (Var, Val)
      if ForwardChecking
        then UpdatePossibleValuesOfVars(UnassignedVariables, Constraints)
      if Solve (UnassignedVariables) then return solution
      if ForwardChecking
        then RestorePossibleValuesOfVars(UnassignedVariables)
      PossVals←DependencyDirectedPruning (Var, PossVals, PruningRules)
  Unassign (Var, Val)
  return failure The backtracking schema follows closely to the way Prolog works in terms of goal directed. The generic CSP backtracking search operates by successfully selecting a variable then assigning it a value. Backtracking occurs when all values for a variable fail to satisfy a constraint. However, this schema combined with a meta-inference theory can refer to rules for variable ordering, value ordering, and pruning that can be used to direct the search process. There are also flags that control whether or not heuristic mechanisms such as forward checking are used. Once the rules, flags and problem constraints are given, the schema can be optimized via partial evaluation.

Priority of constraints to be applied for the privacy model draw from the personal content ownership model four specific contents: contact, content, metadata and environment. The properties of the constraints set by the user preferences and the "ownership" of the content provides the context for enabling the rights to be given to be associated with a piece of content and the permissions that are then granted by these rights. These four specific contexts are applied via a priority mechanism (constraint reasoner), which are based on the following rules:

1. Contacts: When applied to a known set of contacts, the most constraint-based preference for an individual is checked first
2. Contacts: When applied to an anonymous set of contacts, the most constraint-based preference will be applied if no user intervention is applied
  a. Remove all personal metadata and reference
  b. Remove all links and global contact details
  c. Validate all content as being owned by the user with no restrictions
  d. Remove any content which in the past has been previously prohibited for sharing with an anonymous group 3. Location: When target location is a person's owned space for personal access, validate other people with access and verify the user's preference for their access to this content (apply rule 1 and 2 above)
4. Location: When only user has access, then apply user's preferred access to this content for this context
5. Device: as in rules 3 and 4, the device can be considered in a similar manner to location. When target device is a person's owned space for personal access, validate other people with access and verify the user's preference for their access to this content (apply rule 1 and 2 above)
6. Device: apply rules 1 and 2 if device is owned by another user
7. Metadata: on validation of rules 1 to 6 then apply user's preferences to the use of metadata. If no user preference exists then:
   a. Remove personal metadata and any reference to contacts information
   b. Remove automated annotations that could provide "personal context" (includes date, location etc.)
8. Content: On validating rule 7 then apply user's preferences to the use of content (e.g. view only, copy, give etc.). If no user preferences exist then allow only viewing of the image if user has the ownership rights to enable this.

The policy processor 211 can specifically determine suitable policies as set out below.

Match current user task to appropriate personal policy model using constraint matching process. The general constraint schema is provided above. Context used and required within this matching process are the set of content type identified in when understanding the ACE's content composition. The content type make up the basic set of user constraints, there is the possibility of more specific user constraints, user preferences and where appropriate the default privacy preference model to be applied.

We assume for selection of the policy that there can potentially be no historical information available (e.g. past selections as this is the worst case), and so the recommendation of the appropriate policy is based on the constraints and preferences provided by the current user (once past history has been created and a profile is stabilised then this can be used as context constraint input). Formally, the problem is defined as the following. KB is a knowledge-based (or information system of another type) that contains descriptions about policy preferences of certain content type. Each policy $p_i$ is specified as a vector $pi=<p_{i1}, p_{i2}, \ldots, p_{it}>$, in which each $pij$ is the value of the policy on an attribute $A_j$.

In the simplest form, the user's request consists of a constraint vector $c=<c_1, c_2, \ldots, c_t>$ and a preference vector $pref=<pref_1, pref_2, \ldots, pref_t>$. Each element of these two vectors is a condition for the corresponding attribute value. So for example a simple task mapping to a constraint is the selection of holiday photos. The application task sets then the constraints and policies about holiday photos. If not policies exist specifically then the personal privacy preference model is used. If no preferences exist for this the user can use either a default model or no privacy model at all.

A condition in constraint, $c_j$, is a binary expression of the form "X relation v", where X is a variable representing an attribute value, v is a constant value of the corresponding attribute, and relation is one of the following relations: $=, \neq, <, \leq, >, \geq$, where the last four are only defined on attributes whose values form a total order (therefore $X \neq Y$ can always be further specified as $X<Y$ or $X>Y$). The value of such an expression is either 1 (for "true") or 0 (for "false"). When dealing with simple atomic types of the content (which may be the main composition of an ACE content) then the match of the content type will be $=$ or $\neq$. However, in the composition and groupings then an order exists as a content type e.g. region and any related description being a subset of the content image itself. This means that the constraint on the lowest common denominator e.g. region and its associated metadata may take policy precedence over the overall set of policies if it is more constraining. However, e.g. if all in this condition the automated annotations should be removed but personal annotations remain then for example in FIG. 1 then the ACE containing metadata associated to N5 to N7 will be "removed" while N2 (personal annotations will remain). It is worth noting that the action of removal can be seen in three different ways (1) if the packing of an ACE with its content is via virtual links then these links will be removed before the ACE is used to achieve the user task (E.g. send this content to my friend), (2) a duplicate ACE and is modified to reflect the user's policies e.g. the physical metadata content is not packaged with that ACE or (3) the metadata is permanently removed from the ACE as a type of trash can function A condition in preference has the same form as a constraint, except that the relation is "$\approx$", for "similar to", and the expression is not binary, but has a value in a certain range. That is, to what extent a preference is satisfied is a matter of degree. Without losing generality, we take the range to be the interval [0, 1]. As a special case, "$X \approx v$" has value 1 if and only if "$X=v$" is true. Therefore, the similarity relation can be seen as a generalization of the equality relation, from binary to multivalued.

For attributes whose values form a total order, two more relations: "$X<<$" is defined as "$X \approx v_{min}$", and "$X>>$" is defined as "$X \approx v_{max}$", where "$v_{min}$" and "$v_{max}$" are the minimum and maximum value of the corresponding attribute, respectively (they do not need to be a finite value). Intuitively, these preferences mean "has a small value" and "has a large value", respectively. Therefore, constraints and preferences correspond to different ways to assign a "score" to a value of a product on an attribute.

After applying on a value $p_{ij}$, a constraint $c_j$ provides a score in $\{0, 1\}$, a preference $p_j$ provides a score in [0, 1].

There is a special condition "null" for "no constraint/preference". This means that no personal content ownership policy or preference will be applied and will be treated as content that is sent currently. If the content is commercial then the privacy engine will apply the commercial agreement policy.

Matching the policy becomes:
1. Apply the user constraint $c=<c_1, c_2, \ldots, c_t>$ on the knowledge base KB. For each policy $p_i=<p_{i1}, p_{i2}, \ldots, p_{it}>$, if its value $p_{ij}$ satisfies condition $c_j$ for all $j=1 \ldots t$, then it becomes a candidate policy (most general policy or most restrictive constraints)
2. The above step produces a set of candidates of size M.
3. Apply the user preference $pref=<pref_1, pref_2, \ldots, pref_t>$ to each policy di in the candidate set, and get a vector of scores $<s_{i1}, s_{i2}, \ldots, s_{it}>$, where $s_{ij}$ is the return value of applying preference $pref_j$ to value $p_{ij}$.
4. Apply a priority policy function f(x) to the score vector of each policies pi in the candidate set to get a total score $si=f(<s_{i1}, s_{i2}, \ldots, s_{it}>)$, which is a numerical value.
5. Select the highest policies according to their total scores, and return them as the recommendation to the user.

If only one identified policy at any point then provides this as the option. The user can edit the conditions of any policy at any point in time. Each ACE may result in a set of appropriate policies. Each identification node has an appropriate policy attached that contains the context of the personal privacy preference policy for the associated content. The priority rules are used to determine which policy to apply first.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein.

Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An method for content access rights management comprising:
a communication unit performing:
receiving a picture along with metadata related to the picture;
storing a user preference model indicative of user preferences for access to the picture and the metadata related to the picture, wherein the user preference model allows access to the picture, but restricts access to the metadata related to the picture; and
transmitting the picture and the metadata to a second apparatus, wherein the picture and/or the metadata transmitted to the second apparatus has embedded self governance rules within the picture and/or metadata, the embedded self governance rules allowing access to the picture, but restricting access to the metadata related to the picture.

2. The method of claim 1 wherein the user preference model is a privacy preference model indicative of privacy preferences for a user associated with the picture.

3. The method of claim 1, wherein the self-governance rules are determined in response to a relative prioritisation of different parameters of the user preference model.

4. The method of claim 3, wherein access user characteristics have a higher prioritisation than access context characteristics which have a higher prioritisation than content characteristics for the picture.

5. The method of claim 1 further comprising modifying the user preference model in response to a user preference determination for a second picture.

6. The method of claim 1 further comprising generating policy rules in response to the user preference model, wherein the set of self-governance rules are determined in response to the policy rules.

7. The method of claim 6 further comprising validating a set of policy rules.

8. The method of claim 1 further comprising determining the set of self-governing rules in response to a generation of self-governing rules for previous pictures.

9. The method of claim 1 further comprising determining the set of self-governing rules in response to a content characteristic of the picture.

10. The method of claim 1, further comprising detecting a discrepancy between a self-governance rule for the picture and a self-governance rule for at least one previous picture and generating a user alert in response to a detection of the discrepancy.

11. The method of claim 1, wherein the picture comprises a plurality of pictures and wherein the set of self-governance rules corresponds to different access rights for at least a first picture and a second picture.

12. The method of claim 11, wherein the set of self-governance rules comprises relationship information for the plurality of picture elements.

13. The method of claim 11, further comprising removing in response to the set of self-governance rules at least one of the plurality of picture elements from the picture before transmission to the second apparatus.

14. A picture distribution system comprising:
a first apparatus comprising:
a processing device having access to a stored a user preference model indicative of user preferences for picture access and metadata access ,the metadata related to the picture, the processing device adapted for:
determining a set of self-governance rules for the picture and metadata in response to the user preference model, the self-governance rules for use by other devices including a second apparatus to determine allowable actions for the first picture and the metadata in other devices, wherein the allowable actions include an ability to view the picture and restricting access to the metadata related to the picture, including the set of self-governance rules with the picture and/or metadata , and
transmitting the picture, the metadata, and the set of self-governance rules to the second apparatus, wherein the self-governance rules allow the second apparatus to view the picture, but restricts access to the metadata.

15. A picture distribution system as claimed in claim 14 wherein processing device is arranged to allow access to only a subset of a plurality of picture elements of the picture.

16. A picture distribution system as claimed in claim 14, wherein the set of self-governance rules is context sensitive.

17. A picture distribution system as claimed in claim 14, wherein the processing device is further adapted for encrypting at least one picture element of a plurality of picture elements of the picture.

* * * * *

UNITED STATES PATENT AND TRADEMARK OFFICE
CERTIFICATE OF CORRECTION

| | | |
|---|---|---|
| PATENT NO. | : 8,141,166 B2 | |
| APPLICATION NO. | : 12/088459 | |
| DATED | : March 20, 2012 | |
| INVENTOR(S) | : Charlton | |

It is certified that error appears in the above-identified patent and that said Letters Patent is hereby corrected as shown below:

On the title page, in the Figure, in the Box, in Line 7, delete "(pref" and insert -- (pref. --, therefor.

In Fig. 5, Sheet 5 of 5, in the Box, in Line 7, delete "(pref" and insert -- (pref. --, therefor.

In Column 2, Line 27, delete "HA010397891033.aspx" and insert -- HA010397891033.aspx. --, therefor.

In Column 11, Line 44, delete "itself" and insert -- itself. --, therefor.

In Column 11, Line 46, delete "intended" and insert -- intended. --, therefor.

In Column 13, Line 47, delete "GrantingRights)" and insert -- GrantingRights). --, therefor.

In Column 14, Line 19, delete "rules" and insert -- rules. --, therefor.

In Column 15, Line 16, delete "SelfConfigration" and insert -- SelfConfiguration --, therefor.

In Column 15, Line 31, delete "definition)" and insert -- definition). --, therefor.

In Column 15, Line 61, delete "permissions" and insert -- permissions. --, therefor.

In Column 16, Line 8, delete "Persmissions" and insert -- Permissions --, therefor.

In Column 16, Line 15, delete "Persmissions" and insert -- Permissions --, therefor.

In Column 16, Line 21, delete "Goven,rejectPermssion" and insert -- Govern,rejectPermission --, therefor.

Signed and Sealed this
Eighth Day of January, 2013

David J. Kappos
*Director of the United States Patent and Trademark Office*

CERTIFICATE OF CORRECTION (continued)
U.S. Pat. No. 8,141,166 B2

In Column 16, Line 23, delete "Persmissions" and insert -- Permissions --, therefor.

In Column 16, Line 25, delete "Alsternative" and insert -- Alternative --, therefor.

In Column 16, Line 52, delete "policyContext" and insert -- PolicyContext --, therefor.

In Column 17, Line 28, delete "$R_{pr}$)" and insert -- $R_{pr}$). --, therefor.

In Column 18, Line 3, delete "basis" and insert -- basis. --, therefor.

In Column 18, Line 8, delete "internet" and insert -- internet. --, therefor.

In Column 18, Line 39, delete "viewing)" and insert -- viewing). --, therefor.

In Column 22, Line 33, delete "failure" and insert -- failure. --, therefor.

In Column 23, Line 18, delete "information" and insert -- information. --, therefor.

In Column 23, Lines 43-48, delete "Formally, the problem......an attribute $A_j$." and insert the same in Line 44 as a new paragraph.

In Column 23, Line 47, delete "pij" and insert -- $p_{ij}$ --, therefor.

In Column 24, Line 20, delete "function" and insert -- function. --, therefor.

In Column 24, Line 52, delete "constraints)" and insert -- constraints). --, therefor.

In Column 26, Line 53, in Claim 14, delete "access ,the" and insert -- access, the --, therefor.

In Column 26, Line 65, in Claim 14, delete "metadata ,and" and insert -- metadata, and --, therefor.